United States Patent [19]

Mellard

[11] Patent Number: 5,007,259
[45] Date of Patent: Apr. 16, 1991

[54] AUTOMOBILE ANTI-THEFT DEVICE

[76] Inventor: David Mellard, 701 SE. 22nd St., Fort Lauderdale, Fla. 33316

[21] Appl. No.: 476,785

[22] Filed: Feb. 8, 1990

[51] Int. Cl.$^5$ ............................................. B20R 25/02
[52] U.S. Cl. ........................................ 70/209; 70/226
[58] Field of Search ................. 70/207, 209, 210, 211, 70/212, 225, 226, 213, 214

[56] References Cited

U.S. PATENT DOCUMENTS

| | | | |
|---|---|---|---|
| 1,448,658 | 3/1923 | Furber | 70/211 |
| 3,190,090 | 6/1965 | Zaidener . | |
| 3,348,391 | 10/1967 | Barnwell . | |
| 3,898,823 | 8/1975 | Ludeman . | |
| 4,103,524 | 8/1978 | Mitchell et al. . | |
| 4,116,297 | 9/1978 | Ross et al. . | |
| 4,304,110 | 12/1981 | Fain . | |
| 4,432,432 | 2/1984 | Martin . | |
| 4,444,030 | 4/1984 | Dausch | 70/209 |
| 4,699,238 | 10/1987 | Tamir . | |
| 4,738,127 | 4/1988 | Johnson | 70/209 |
| 4,750,341 | 6/1988 | Laguna | 70/226 |
| 4,829,797 | 5/1989 | Wu | 70/209 |

Primary Examiner—Robert L. Wolfe
Attorney, Agent, or Firm—Herbert L. Lerner; Laurence A. Greenberg

[57] ABSTRACT

An anti-theft device for a motor vehicle with a steering wheel and a driver's seat, comprising a first rod disposed on one side of the rim and a spoke of the steering wheel, a projector bar extending toward the driver's seat, a second rod being disposed on the other side of the rim and the spoke of the steering wheel, a locking spike attached to the second rod, and means for locking the projector bar and the locking spike to the first rod for clamping opposite sides of the steering wheel and preventing a person from sitting on the driver's seat.

16 Claims, 1 Drawing Sheet

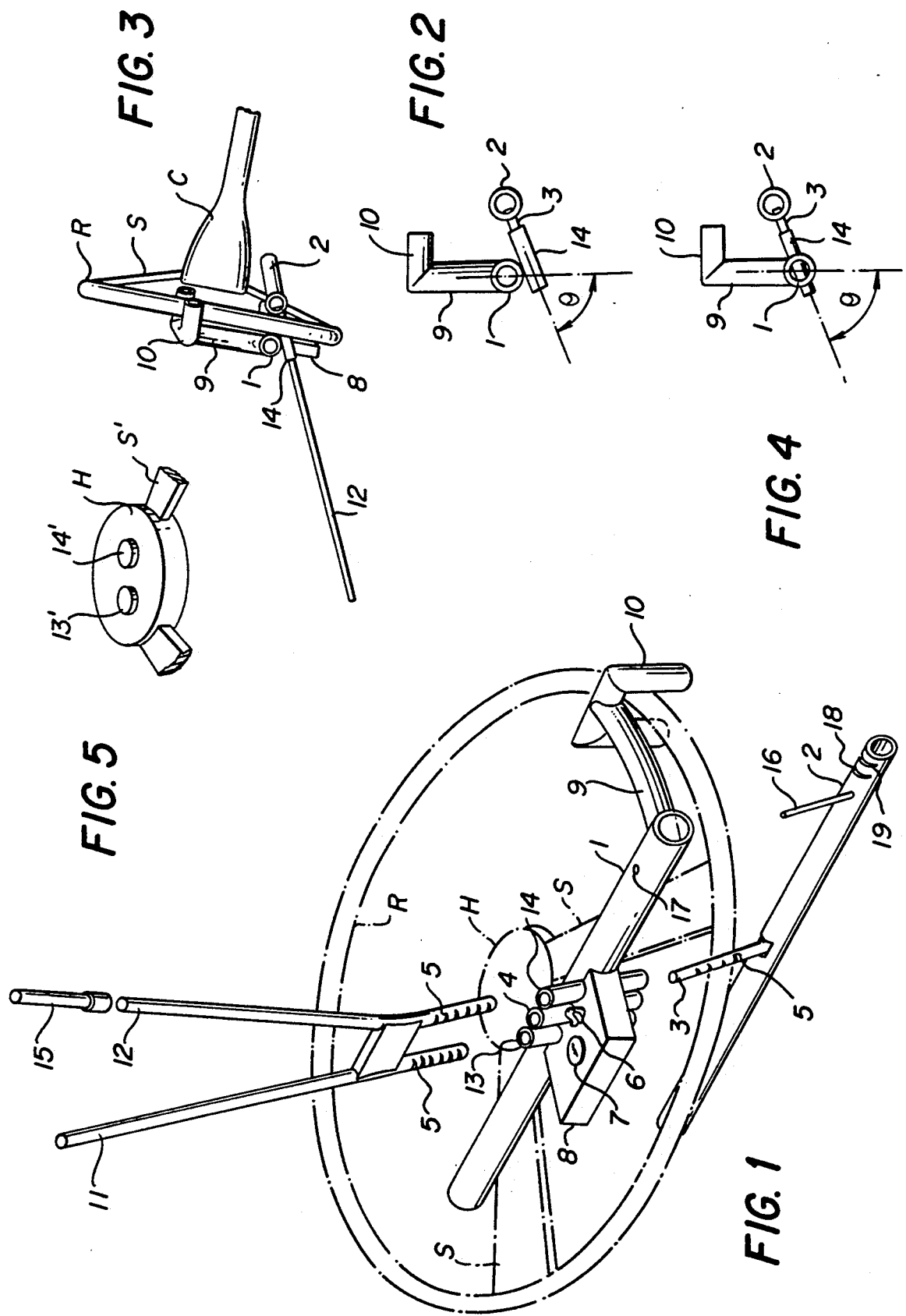

AUTOMOBILE ANTI-THEFT DEVICE

BACKGROUND OF THE INVENTION

1. Field of the Invention

The invention relates to an anti-theft device for automobiles, and in particular a device attachable to the steering wheel of a motor vehicle which prevents a potential thief from sitting behind the steering wheel where he or she could defeat the device and drive the car.

2. Description of the Prior Art

It is a well known fact that professional car thiefs are hardly deterred by standard-equipment car locks. Accordingly, many devices have been proposed which aid in the prevention of automobile thefts.

One group of such devices are those which interlock the steering wheel with one or several of the foot pedals. This group is represented by inventions such as those disclosed in U.S. Pat. Nos. 4,699,238 to Tamir, 3,190,090 to Zaidener and 4,432,432 to Martin. A further device which is related to this group is disclosed in U.S. Pat. No. 3,898,823 to Ludeman, which relates to a locking device for aircraft controls.

A second group of devices serve the purpose of preventing or impairing the turning of the steering wheel. That group is represented by U.S. Pat. Nos. 4,304,110 to Fain, 4,103,524 to Mitchell et al, 3,348,391 to Barnwell and 4,750,341 to Laguna.

A third type of anti-theft device is represented by U.S. Pat. No. 4,116,297 to Ross et al. The invention disclosed in that patent relates to pushing the seatback forward against the steering wheel. The fact that the seatback is being held in a forward position will prevent a potential thief from sitting in the driver's seat while defeating the steering wheel lock. However, that device is applicable only to seats with forwardly reclineable seatbacks, i.e. to two-door cars.

The first two groups of anti-theft devices allow the car thief to sit on the driver's seat and go about his or her business to defeat any of the devices which may be attached to the wheel. The thief almost always has as much time as he or she needs, and no lock appears to be unbreakable when the burglar is given enough time to do so.

SUMMARY OF THE INVENTION

It is accordingly an object of the invention to provide an automobile anti-theft device, which overcomes the hereinafore-mentioned disadvantages of the heretofore-known devices of this general type and which physically prevents a potential thief from sitting behind the steering wheel while attempting to start and drive off with the vehicle. Once a thief gains access to a car, he or she can simply sit on the driver's seat with the door closed and, practically incognito, soon defeat the anti-theft device and operate the vehicle. The invention is intended to prevent such access and, accordingly, to prevent the potential thief from sitting behind the wheel.

With the foregoing and other objects in view there is provided, in accordance with the invention, an anti-theft device for a motor vehicle with a steering wheel and a driver's seat, comprising a first rod disposed on one side of the rim and a spoke of the steering wheel, a projector bar extending toward the driver's seat, a second rod being disposed on the other side of the rim and the spoke of the steering wheel, a locking spike attached to the second rod, and means for locking the projector bar and the locking spike to the first rod for clamping opposite sides of the steering wheel and preventing a person from sitting on the driver's seat.

In accordance with a further feature of the invention, the locking means include a projector locking tube for receiving the projector bar, a spike tube for receiving the locking spike, and a locking mechanism for resiliently locking the projector bar in the projector locking tube and the locking spike in the spike tube.

In accordance with an added feature of the invention, the first rod includes two ends and an extension rod extending substantially perpendicularly from one of the ends, the extension rod having a substantially U-shaped grip attached thereto opposite the first rod for engaging in and gripping the rim of the steering wheel.

In accordance with an additional feature of the invention, the projector bar includes means for varying its length.

In accordance with again another feature of the invention, these means are in the form of extension sections.

In accordance with a further feature of the invention, the anti-theft device includes a second projector bar associated with the first projector bar.

In accordance with again an added feature of the invention, the projector bar includes means for varying the length to which the projector bar protrudes from the locking means. Accordingly, the anti-theft device can be adapted to various distances between the steering wheel and the seatback of the driver's seat. The means may be in the form of grooves disposed on the projector bar and a locking mechanism in the projector locking tube. The locking mechanism may be in the form of a tooth for engaging in the grooves.

In accordance with again an additional feature of the invention, the locking spike includes grooves and the locking mechanism includes a tooth for engaging in the grooves.

In accordance with yet another feature of the invention, the first rod includes a torsion prevention receptacle, and the second rod includes a torsion prevention spike for engaging in the torsion prevention receptacle. This prevents the second rod to be twisted off the first rod and off the steering wheel.

In accordance with still a further feature of the invention, the second rod includes means for receiving the rim of the steering wheel, for preventing the rod from being twisted off the steering wheel. These means may be in the form of elevations on the rod which are spaced apart so as to receive the rim of the steering wheel.

In accordance with a concomitant feature of the invention, there is provided, in a motor vehicle with a driver's seat, a combination steering wheel and anti-theft device, comprising a projector bar extending toward the driver's seat, and means attached to the steering wheel for locking said projector bar to the steering wheel for preventing a person from sitting on the driver's seat.

Other features which are considered as characteristic for the invention are set forth in the appended claims.

Although the invention is illustrated and described herein as embodied in an automobile anti-theft device, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE DRAWINGS

FIG. 1 is a partly-broken away, diagrammatic, exploded perspective view of the anti-theft device in accordance with the invention;

FIG. 2 is a side-elevational view of a portion of the anti-theft device; and

FIG. 3 is a side-elevational view of a steering column with a steering wheel and the anti-theft device attached thereto;

FIG. 4 is a side-elevational view of a portion of a second embodiment of the invention; and FIG. 5 is a fragmentary perspective view of a third embodiment of the invention, wherein the tubes are integral with the steering wheel.

DESCRIPTION OF THE PREFERRED EMBODIMENTS

Referring now to the figures of the drawing in detail and first, particularly, to FIG. 1 thereof, there is seen a tubular rod or bar 1 and a tubular rod or bar 2 of approximately equal dimensions. An extension rod or locking spike 3 is attached to a center portion of the bar 2. The bars 1 and 2 may be connected by inserting the locking spike 3 into a spike hole or spike receiving tube 4, which is attached to the bar 1. The spike 3 has several notches 5 formed therein into which a ratchet tooth 6 inside the spike tube 4 is engaged. The ratchet tooth 6 is shown to be located inside the broken-away section of a lock 7. The ratchet tooth 6 may be controlled via a keyhole in the lock 7 which is disposed in a keybox 8. Alternatively, the locking mechanism or lock 7 may be equipped with a combination lock.

When the locking spike 3 is engaged in the spike tube 4, the two bars 1 and 2 clamp onto a rim R and a spoke S of a steering wheel, which is shown in phantom in FIG. 1. An extension rod 9 extends approximately perpendicularly from one end of the bar 1. The extension rod 9 is curved to match the curvature of the steering wheel rim R. The end of the extension rod 9 opposite the bar 1 is formed of a hook grip 10 for receiving the rim R.

When the rods 1 and 2 are locked together and clamped onto the steering wheel, the hook grip 10 prevents the clamped rods 1 and 2 from being slipped off the steering wheel.

As indicated in FIG. 1 and further illustrated in FIG. 2, the axes of the extension rod 9 and the tube 14, which is parallel to the tube 4, are shown in dotted lines in FIG. 2, form an angle $\phi$ which is considerably less than 90°. This further increases the rigidity of the anti-theft device in accordance with the invention, in that the rods 1 and 2, in the clamping position, are located directly across each other on the rim R. Furthermore, the longitudinal axis of the tube 4 is not intended to lie parallel to the axis of the steering column. For better clarity of FIG. 2, the lock box 8 has been omitted in FIG. 2.

The diameter of the rim R is larger than the thickness of the spoke S. Accordingly, the rods 1 and 2, in the clamping position are not oriented parallel.

As illustrated in FIG. 3, the spokes may be obliquely angled out of the plane of the steering wheel rim, towards a hub H of the steering column. Depending on this angle, the rods 1 and 2 are not intended to be oriented at an angle other than 90° with respect to the steering column C.

After the rods 1 and 2 and the extension rod 9 with the hook grip 10 are clamped onto the steering wheel, a set of extension rods or projector bars 11 and 12 are inserted into corresponding bar tubes or projector locking tubes 13 and 14. The projector bars 11 and 12 also have several notches 5 for locking with locking mechanisms 6. Due to the several notches on the extensions of the projector bars 11 and 12 which are to be inserted in the looking tubes 13 and 14, the actual length of the projector bars 11 and 12 may be adjusted. Accordingly, if the seatback is farther away from the steering wheel, the locking mechanism will engage in the notches 5 close to the end of the projector bar, while, in the case the seatback is closer to the steering wheel, the locking mechanism 6 will engage in notches 5 closer to the center of the projector bars 11 and 12.

In addition, the projector bars 11 and 12 may be elongated by means of extensions such as an extension section 15. The extension 15 shown in FIG. 1 may be partly slipped onto and attached to the projector bar 12, in order to increase its actual length.

Although only one lock 7 is shown on the keybox 8 for controlling the locking mechanisms 6 simultaneously within the tubes 4, 13 and 14, the anti-theft device may include two independent locks, one for the tube 4, which receives the locking spike 3, and one for the tubes 13 and 14, which receive the ends of the projector bars 11 and 12.

With an understanding of the functionality of the invention it becomes clear that the three receiving tubes 4, 13 and 14 are fully interchangeable. Accordingly, the spike tube 4 may be at any of the positions, left, center or right. The same is true for the receiving tubes 13 and 14. In the case that tube 4 is located in a side position, left or right, the distance between those ends of the projector bars 11 and 12 which insert into the receiving tubes 13 and 14, would have to be adapted accordingly.

The bar 2 shown in FIG. 1 has an additional extension rod or torsion prevention spike 16 to be inserted in the opening or torsion prevention receptacle 17 in bar 1. This prevents the bar 2 from being twisted off the steering wheel about the axis of the locking spike 3. A second such torsion lock is shown in FIG. 1. Elevations 18 and 19 on the bar 2 are spaced apart at a mutual distance of approximately the diameter of the steering wheel rim R. Accordingly, when the rim R is placed between the elevations 18 and 19, i.e. the steering wheel is sandwiched between the rods 1 and 2, the bar 2 is prevented from being twisted off the steering wheel rim against the resistance of the elevations 18 and 19.

As shown in FIG. 1, the projector bars 11 and 12 form an angle with each other. The distance between the ends is such that a person cannot fit in between. Accordingly, when the projector bars 11 and 12 are attached to a steering wheel they will prevent anyone from sitting in the driver's seat. Furthermore, should a person actually be able to squeeze onto the driver's seat, the bars 11 and 12 will prevent the steering wheel from being turned. On the other hand, when the projector bars are removed from the locking mechanism 6, the vehicle can easily be operated while keeping the rods 1 and 2 attached to the steering wheel.

As illustrated in FIG. 3, the extension rod 9 is oriented parallel to the plane of the steering wheel W. Accordingly, the projector bars 11 and 12 form an angle with the axis of a steering column C other than 180°. In other words, neither of the axes of the projector bars 11 and 12 are parallel to the axis of the steering column.

The length of the projector bars 11 and 12 is chosen such that the ends thereof extend very close to the seatback of the driver's seat.

The embodiment illustrated in FIG. 4 is a slight variation of the anti-theft device in accordance with the invention. The locking tubes 13, 14 and 4 extend directly through the bar 1. The angle $\phi$ remains the same as that already shown in FIG. 2.

In the embodiment of FIG. 5, tubes 13' and 14' are integral with the hub H' of a steering wheel. The ends of the projector bars 11 and 12 of FIG. 1 are insertable into the tubes 13' and 14'. Therefore, the device may be produced as a combination steering wheel and anti-theft device.

I claim:

1. An anti-theft device for a motor vehicle having a driver's seat with a seatback and a steering wheel with opposite sides, a rim and a spoke, comprising a first rod disposed on one side of the rim and the spoke of the steering wheel, a projector bar, a second rod being disposed on the other side of the rim and the spoke of the steering wheel, a locking spike attached to said second rod, first means for locking between said first and second rods, and second means for locking said projector bar to said first rod with said projector bar extending toward the seatback regardless of the rotational position of the steering wheel for preventing a person from sitting on the driver's seat.

2. The anti-theft device according to claim 1, wherein said second locking means include a projector locking tube for receiving said projector bar, and said first locking means include a spike tube for receiving said locking spike, and locking mechanisms associated with said first and second means for respectively resiliently locking said projector bar in said projector locking tube and said locking spike in said spike tube.

3. The anti-theft device according to claim 1, wherein said first rod includes two ends and an extension rod extending substantially perpendicularly from one of said ends, said extension rod having a substantially U-shaped grip attached thereto opposite said first rod for engaging in and gripping the rim of the steering wheel.

4. The anti-theft device according to claim 1, wherein said projector bar includes means for varying the length thereof.

5. The anti-theft device according to claim 4, wherein said means are in the form of extension sections.

6. The anti-theft device according to claim 1, including a second projector bar associated with first-mentioned projector bar.

7. The anti-theft device according to claim 1, wherein said projector bar includes means for varying the length to which said projector bar protrudes from said second locking means.

8. The anti-theft device according to claim 7, wherein said means are in the form of grooves disposed on said projector bar and a locking mechanism in said projector locking tube, said locking mechanism being in the form of a tooth for engaging in said grooves.

9. The anti-theft device according to claim 1, wherein said locking spike includes grooves and said first locking mechanism includes a tooth for engaging in said grooves.

10. The anti-theft device according to claim 1, wherein said first rod includes a torsion prevention receptacle, and said second rod includes a torsion prevention spike for engaging in said torsion prevention receptacle.

11. The anti-theft device according to claim 1, wherein said second rod includes means for receiving the rim of the steering wheel, for preventing the rod from being twisted off the steering wheel.

12. In a motor vehicle having a driver's seat with a setback, a combination steering wheel and anti-theft device, comprising a projector bar and means attached to the steering wheel for locking said projector bar to the steering wheel with said projector bar extending toward the seatback regardless of the rotational position of the steering wheel, for preventing a person from sitting on the driver's seat.

13. The anti-theft device according to claim 1, wherein a steering column with a longitudinal axis is attached to the steering wheel, and said projector bar extends toward the seatback at an angle less than substantially 45° relative to the longitudinal axis of the steering column.

14. The anti-theft device according to claim 1, wherein said projector bar extends to and substantially touches the seatback.

15. The combination according to claim 12, wherein a steering column with a longitudinal axis is attached to the steering wheel, and said projector bar extends toward the seatback at an angle less than substantially 45° relative to the longitudinal axis of the steering column.

16. The combination according to claim 12, wherein said projector bar extends to and substantially touches the seatback.

* * * * *